United States Patent [19]

Armstrong

[11] 4,146,534

[45] Mar. 27, 1979

[54] LIQUID CYCLONE PROCESS

[75] Inventor: David J. Armstrong, Oakville, Mo.

[73] Assignee: Ralston Purina Company, St. Louis, Mo.

[21] Appl. No.: 787,404

[22] Filed: Apr. 14, 1977

[51] Int. Cl.$^2$ .................................................. A23J 1/14
[52] U.S. Cl. .............................. 260/123.5; 260/112 R
[58] Field of Search ......................... 260/112 R, 123.5

[56] References Cited

U.S. PATENT DOCUMENTS

| | | | |
|---|---|---|---|
| 3,723,407 | 3/1973 | Miller et al. | 260/123.5 |
| 3,895,003 | 7/1975 | Swain et al. | 260/123.5 |
| 3,972,861 | 8/1976 | Gardner et al. | 260/123.5 |

OTHER PUBLICATIONS

Gardner et al., Oil Mill Gazetteer, vol. 78, No. 6, Dec. 1973, pp. 12–17.

*Primary Examiner*—Walter C. Danison
*Attorney, Agent, or Firm*—W. Dennis Drehkoff

[57] ABSTRACT

A process for the recovery of protein from vegetable protein material is disclosed which involves differential settling and separation of protein bodies and cellular debris from the material by hydrocyclone separation. The process includes the steps of grinding vegetable protein material to a particle size range of less than about 40 microns, preferably less than about 10 microns followed by admixing the ground material with an aqueous suspension medium having a pH of 4.5, separating the protein bodies from the non-proteinaceous material by hydrocyclone separation into underflow and overflow streams, the underflow stream substantially containing intact protein bodies, the overflow stream substantially containing cellular debris and recovering the solids from both streams. The underflow stream which is separated from the aqueous suspension medium provides protein concentration of at least 68% by weight. Further processing of the underflow stream by hydrocyclone separation removes additional soluble salts and carbohydrates to provide protein solids of at least 68 to 82% by weight.

The novel process of the instant invention provides for the simultaneous purification and separation of protein bodies from vegetable proteinaceous material to form a protein concentrate.

30 Claims, 3 Drawing Figures

LIQUID CYCLONE PROCESS

BACKGROUND OF THE INVENTION

This invention generally relates to a process for the recovery of vegetable protein material and more specifically to the formation of a vegetable protein concentrate from defatted soybean material.

This invention was conceived and developed largely for soy materials because of the special problems encountered with such materials. Therefore, it will be explained largely with respect to soy materials, and has special application to such materials, although it can be used for other oilseed protein materials in the broader aspects of the invention.

Protein concentrates derived from vegetable protein material such as soybeans enjoy widespread commercial use to fortify foods and beverages in order to increase their nutritional value. The term "concentrate" is defined in the art as a vegetable protein material having a protein concentration of between 70 and 90% by weight, and is usually obtained by the partial removal of non-proteinaceous material from defatted vegetable protein material in order to increase the resultant protein concentration to greater than 70% by weight. Many processes are known for soybean concentration production including washing techniques wherein defatted soybean flakes are washed with solvents such as water, aqueous alcohol, or dilute acids to remove soluble carbohydrates and increase the protein content to 70% or higher. For example, U.S. Pat. No. 3,734,901 describes a two-stage extraction to remove lipids and water soluble constituents from soybean flakes to obtain a concentrate. However, the soybean concentrate of the present invention is extracted and separated from carbohydrate material in a facile method that permits the soy protein to retain excellent functional properties while lacking the common, bitter, beany taste and objectionable odor and color of concentrates made from conventional processes.

Generally speaking, some techniques for producing protein isolates are applicable in the production of protein concentrates from oilseed materials. A protein isolate can be generally characterized as a product resulting from the extraction, subsequent concentration and purification of proteinaceous material from a proteinaceous source such as vegetable protein or oilseed material. Typically, the protein isolate on a moisture free basis will have a protein content which will range between about 90 and 98% by weight after isolation of the protein and separation from the non-proteinaceous and cellular material present in most types of vegetable protein material. Isolates are generally produced by dissolving a vegetable protein material in the form of an oilseed meal such as soybean meal above or below the isoelectric point of the soy protein and then adjusting the pH of the solution to the isoelectric point to precipitate the purified protein. At this point in the process, the protein curd or precipitated, purified protein has adequate functional properties. However, in many food applications, it is not considered to possess the best flavor since undesirable flavor components remain entrapped in the precipitated protein and further processing is normally required to provide an isolate with a bland flavor to be suitable for use in a variety of food products. Therefore, additional centrifugation or separation of the protein is carried out in order to remove any entrapped undesirable flavor components. Repeated washing of the precipitated curd is needed to remove most of the entrapped flavor components. However, it has been recognized that while washings of the curd with either water, alcohols or mixtures thereof results in an improvement in flavor; nevertheless, repeated processing of this type reduces the overall efficiency of the isolation process since a certain percentage of the protein is lost during each washing step thereby reducing the yield. The more processing that is involved the more likely one is to destroy the desirable functional properties of the proteinaceous components and the less flexibility there is in regard to the quality of proteinaceous material from which the concentrate or isolate is prepared.

Recently, new techniques in protein isolation have described means for isolating intact protein bodies directly from the vegetable protein source material, without solubilization of the proteinaceous material or preliminary washings for carbohydrates. Theoretically, the removal of the intact protein bodies to form a concentrate or isolate would avoid undesirable interactions of the proteins and other cellular components of the protein material which diminish functional properties of the protein material or have other undesirable side effects. A technique of the above type for the recovery of the intact protein bodies from a vegetable source material without solubilization is that of density gradient centrifugation or fractionation. This technique involves the use of a medium having a specific density range with the ground proteinaceous material containing intact protein bodies, starch, fat and other cellular material that is dispersed followed by centrifugation thereof. Centrifugation provides a separation of the intact protein bodies, the cellular material and fat in three different phases. Removal of a phase containing protein bodies obviously provides protein material whose protein content has been increased. Techniques involving the isolation of intact protein bodies using density fractionation are described in U.S. Pat. Nos. 3,828,017 and 3,869,438 wherein the mixture of a fluorocarbon and a low density hydrocarbon are employed as the medium having a density of 1.35 to 1.45 for fractionation of the ground protein material from oilseeds. Other mediums used in the fractionation of intact soybean protein bodies include aqueous sucrose solutions having a density of 1.28 to 1.32 as described in *Plant Physiology* 42 page 797 (1967), and mixtures of oil and carbontetrachloride and having a density between 1.36 and 1.39 as described in *Journal of Agriculture and Biological Chemistry* 30 page 1133 (1966).

Methods concerning the production of oilseed concentrates are shown in U.S. Pat. No. 2,881,076 wherein the native protein is insolubilized in an aqueous solution with a pH of 4.0 to 4.8; Canadian Pat. No. 697,264 shows the use of an aqueous extracting agent and high temperatures to remove the bitter or beany flavor from defatted soy meal to produce a concentrate and U.S. Pat. No. 3,895,003 describes a process for producing oilseed protein concentrates by particle size classification. This disclosure teaches a two step grinding procedure followed by a water or alcohol washing to produce a soy concentrate product. The differential grinding of the soy material is permitted because of the inherent large particle size of the cellular materials which makes them susceptible to easy reduction in size. Additionally, it is relatively difficult to reduce the size of the protein bodies by grinding. Thus, protein separation and concentration is accomplished by grinding, air classifying and washing of the coarse particle fraction of the soy material with alcohol or water at a pH of 4 to 6 and separating the insoluble protein from the washed solution.

U.S. Pat. No. 3,901,725 describes a wet process for separating wheat starch granules according to size. The particular large size of the granules permits a large variety of uses. U.S. Pat. No. 3,972,861 relates to the preparation of cottonseed protein concentrate by grinding and liquid cyclone separation. The separation of the protein in the cottonseed takes place with relative ease due to the large size of the pigment glands and cellular fraction.

The present invention represents an improvement in the art for the separation of protein concentrates, especially those derived from soy protein. The preferred yield of protein bodies from a vegetable protein material is obtained from the present process which describes critical parameters necessary to provide protein concentrates which have not undergone extensive washing with either alcohol or water, but yet still retain improved flavor and functional characteristics.

SUMMARY OF THE INVENTION

The present invention comprises a process for the production of a protein concentrate from a vegetable protein material, specifically an oilseed material such as soy flakes, by separation of the intact protein bodies from this material. The process comprises the steps of grinding the vegetable material to a particle size range of less than about 40 microns, admixing the ground material with an aqueous medium having a pH of 4.5, separating the protein bodies from non-proteinaceous mateirals by hydrocyclone separation into underflow and overflow streams, the underflow stream substantially containing intact protein bodies, the overflow stream substantially containing cellular debris and recovering the solids from both streams. The protein enriched underflow stream can be employed to provide a protein concentrate having a protein concentration of at least about 68%. This concentrate containing intact protein bodies may be treated again by hydrocyclone separation to thereby increase the protein content and provide a protein isolate from the intact protein bodies having a protein content on the order of at least about 75% to 82% by weight.

The present process for the production of a concentrate from intact protein bodies differs from a conventional process by not requiring repeated solubilization of the protein bodies and reprecipitation of the protein in an acid medium. A concentrate can be produced from the intact protein bodies which has desirable functional properties including acceptable color and flavor.

It is an object of the present invention to produce protein concentrates from vegetable protein material. It is a further object of the present invention to separate and purify intact protein bodies from vegetable protein material. And yet another object of the present invention is to provide a method of producing a higher yield of protein concentrate from vegetable protein material than conventional methods while maintaining desirable functional properties and taste requirements.

DETAILED DESCRIPTION OF THE INVENTION

Figure 1:
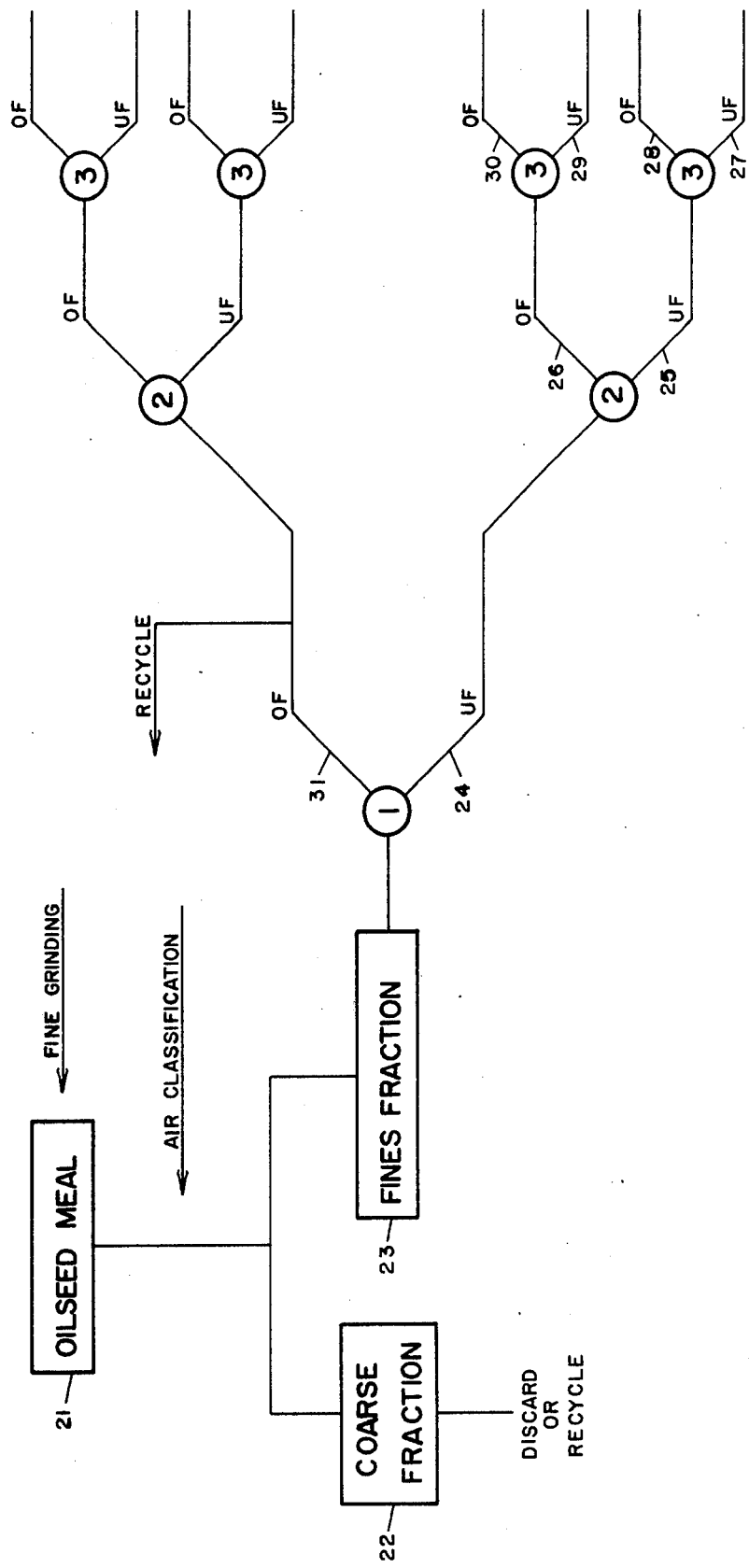
FIG. 1 herein is a block diagram flow chart showing the present process for obtaining a protein concentrate from vegetable protein material.

Defatted flakes or oilseed materials, such as soybean flakes, are the preferred starting material for the present process. Defatted soy flakes are generally available and widely used as a starting material for conventional processes for the production of isolates and concentrates. The particular technique for removing residual oils from ground, whole oilseed flakes is not intended to limit the present invention. Typical techniques for the removal of residual oil from materials of this type include various solvent extraction techniques with hydrocarbon mixtures of hydrocarbon alcohol azeotropes and these techniques are well known in the oilseed processing industry. Difficulty is experienced in separating the fat and protein bodies from whole soybeans due to the small size of fat particles which are generally about 0.5 microns in diameter after being subjected to the grinding step of the present invention. For that reason, defatted flakes are preferred.

After selection of a suitable starting material, it is ground to a critically controlled particle size range. This is an extremely important step in the production of a protein concentrate pursuant to the present invention. The grinding step in the present process is necessary in order to dislodge the intact protein bodies from the cell matrix encapsulating the protein bodies and reduce the possibility of binding between the protein bodies and cellular debris. Since intact protein bodies and vegetable protein materials of the aforementioned type are generally less than about 40 microns in size, usually less than 10 microns in size, the highest yield of the intact protein materials will occur by grinding the starting material to a particle size range of less than about 10 microns in size. If a particle size range greater than 10 microns is employed, protein body concentration can still be satisfactorily achieved by the process of the present invention but the yield of the intact protein bodies will generally decrease because of physical attachment between the cellular debris and the protein bodies due to less extensive grinding. Therefore, while a larger particle size range of up to about 40 microns is considered to be within the scope of the present invention; nevertheless, for the maximum yield of intact protein bodies commensurate with the maximum protein content a particle size range of less than about 10 microns is preferred although this might be varied somewhat depending on the exact oilseed used as the starting material. It is also possible to regrind the larger particles in the size range of between 10 to 40 microns, in order to reduce the majority of the particles to a size of less than about 10 microns to further increase and improve the yield of the protein bodies pursuant to the process of the present invention. Therefore, it should be recognized that the resultant purpose of the grinding step of the present invention is to dislodge the protein bodies from the cellular matrix without disruption thereof and the maximum recovery and yield thereof is achieved by grinding of a resultant particle to a specific size range.

Following grinding of the starting material to a critically controlled particle size range, it is preferred, although not limiting the process of the present invention, to provide for classification of the ground particles according to size to provide a fraction which is predominantly of the desired particle size range of less than 40 microns. Obviously, this step may be omitted depending on the efficiency of the grinding technique employed although it is preferred for the maximum benefit of the process of the present invention to classify the ground material according to particle size in order to provide a fraction having a predominant particle size which is less than 10 microns for maximum yield and recovery of the intact protein bodies. Preferably, about 60% of the particles should be less than 10 microns in size. The suitable classification technique for size fractionation of the particles are air classification techniques which are well known in the art and typical apparatus to perform this sieve analysis is an Alpine Airjet Sieve, manufactured by Alpine American Corporation, Natick, Massachusetts. Air classifiers usually involve feeding the particles into a rotor by means of mixing them with an air stream which flows directly through the rotor. The centrifugal force supplied by the rotor moves the coarse particles to the wall of the rotor. The fine particles go through the rotor with the air stream because they have a smaller mass to size ratio. The air flow and rotor speed are important variables which vary depending upon the materials being separated and the air classifier being used. Generally, the fines fraction will be higher in protein concentration. The air classifier may be set to produce particle size fractions of less than 40 microns with the largest particle size fraction having a particle size range of less than 10 microns. Table I below sets forth the typical but non limiting particle size distribution obtained by a single grinding of defatted soy flakes within the critically controlled particle sized range required in the instant invention. Grinding can be carried out with a Contraplex Wide Chamber Mill A250CW manufactured by Alpine American Corporation, Natick, Massachusetts. It may be seen that the highest percentage of material is obtained in the less than 10 micron fraction which is preferred for the process of the instant invention since most protein bodies are of a smaller particle size than 10 microns. As previously noted, the larger fractions can also be employed provided that a lower yield and recovery can be tolerated.

| Particle Size Range | Quantity |
| --- | --- |
| Less than 10 microns | 82 lbs. |
| 10 to 20 microns | 32 lbs. |
| 20 to 45 microns | 29 lbs. |
| Over 45 microns | 7 lbs. |

It is preferred in the instant invention although not limiting that about 60% of the soy flour contains individual particles of less than 10 microns in size. This particle size is preferred to obtain the optimum yield of intact protein bodies.

Following grinding and size classification of the starting material, it is then subjected to hydrocyclone separation to separate the intact protein bodies from cellular debris obtained in the grinding process. This separation technique involves the use of a hydrocyclone separator which separates particles from a mixture of materials most likely in accordance with their size and specific gravity. The technique generally requires the use of a suspending or buffer medium to suspend the ground and size-classified starting material in this instance, soy flour, and to solubilize the sugars present. The buffer medium employed to suspend the starting material can typically comprise a variety of materials to achieve the desired effect. These materials should have an aqueous base and be adjusted to the isoelectric point of the starting material generally around the pH range of 4 to 6. They may generally be selected from the group consisting of any aqueous weak acid or alcohol. If aqueous alcohol mixtures are used, the alcohol concentration should be about 50–95% and preferably 70–80% by weight. In the process of the present invention, a 0.1M acetate buffer at a pH of 4.5 is preferred for separating intact protein bodies from cellular debris in soy flour.

It is preferred, although not limiting, that the finely ground soy flour having a controlled particle size of less than 40 microns and preferably less than 10 microns is mixed with the suspending medium so that about 20 to about 1%, preferably 5% by weight is present in the medium to form a slurry. The suspending medium, preferably at a pH of 4.5, is passed through a hydrocyclone separator and diverted into two fractions upon exiting the separator: an upperflow stream containing enriched cellular debris and low protein content; and an underflow stream containing an enriched protein body fraction, cellular debris and whey. The slurry is supplied under pressure through a tangential feed opening into the hydrocyclone separator. This establishes within the hydrocyclone a swiftly rotating body or vortex of fluid. Centrifugal forces in this vortex cause the heavy particles to remove to the wall of the hydrocyclone; the light particles and most of the liquid are forced toward its axis. Non-tangential current causes the heavy particles that have been thrown to the wall of the separator to move down toward the bottom of the separator where they are discharged in the underflow stream. The bulk of the slurry, which contains the fine particles and particles lighter than the liquid, moves vertically along the axis of the hydrocyclone and is discharged into the overflow stream. The solids can then be separated from each stream. A 5% solids slurry containing about 70% protein would yield a protein concentrate of about 71 to about 79% by weight in the underflow stream. Additionally, before the solids separation, the underflow stream can be subjected to further separation in a series of hydrocyclone separators to yield a protein conventrate containing about 77 to about 82% by weight protein. In order to insure a high protein content in the range of 77 to 82% by weight the liquid can be decanted and the solid material washed with another volume of buffer medium. The medium is first decanted to remove whey components and soluble non-proteinaceous materials. The purpose of washing the solid material is to remove the maximum amount of soluble, non-proteinaceous materials with minimal solubilization of protein material. High molecular weight sugars such as sucrose, stachyose and raffinose are removed from the protein bodies by washing. If it is desired to wash the cellular debris, the protein content of that material is decreased for soy albumen and whey are removed by the washing step. The removal of whey constituents and other non-proteinaceous material is done to insure a more accurate and higher protein content after hydrocyclone separation. However, the removal of these materials is not required to improve the flavor or functional properties of the soy protein and is intended to be optional in the process of the present invention. The use of any aqueous weak acid or aqueous alcohol solution as previously described accomplishes this objective satisfactorily. After this optional washing step, the concentrated protein can be dried by any suitable means.

Figure 2:
FIG. 2 is a microphotograph of intact protein bodies.
Figure 3:
FIG. 3 is a microphotograph of cellular debris.

The liquid cyclone process is a further development of the differential settling process. However, the reason for the separation of the intact protein bodies from cellular debris is not clearly understood. Normally, in conventional procedures, a cyclone separates particles on the basis of their size and specific gravity and the specific gravity of the liquid in which they are suspended. The shape of the particles is also a factor in determining the size of separation. Of course, the physical dimensions of a cyclone separator and the fluid pressure of the slurry as it is supplied to the separator are also factors to be considered in determining the size separation from a given slurry. In the present process, the majority of the protein bodies are recovered in the underflow stream suggesting that fractionation is not based upon differential density alone. The separation is dependent upon other factors such as particle surface area and shape; protein hydration and swelling; protein aggregation; and solution viscosity. The grinding of the defatted soy flakes to less than about 10 microns in size produces cellular debris with irregular shapes and rough surface texture. The intact protein bodies, normally being less than 10 microns in size as shown in FIG. 2, escape most of the physical abuses of the grinding action and retain a smooth texture. It can be surmised that the rough texture and the irregular shape of the cellular debris as shown in FIG. 3, causes their movement upwardly through the vortex and along the axis of the cyclone to be discharged in the overflow stream. Possibly, the flow characteristics of the suspending medium in the cyclone affects the movement of the cellular debris to a greater degree than the protein bodies. The smooth texture and density of the protein bodies will cause them to be caught in the vortex, move to the outer wall of the separator and be forced downward towards the lower opening of the separator into the underflow stream.

OPERATION

As shown in FIG. 1, defatted oilseed meal 21, preferably soybean meal, is finely ground to a particle size of less than 40 microns, preferably less than 10 microns in diameter. The ground meal or flour is preferably subjected to air classification to produce a fine fraction 23 having about 60% of its particles with a diameter of 10 microns or less and a coarse fraction 22. The coarse fraction 22 containing particles over 40 microns in size can be discarded or recycled. The fine grinding and air classification may be accomplished by any convenient method. Fraction 23 is then admixed into an aqueous suspending or buffer medium of 0.1M acetate at a pH of 4.6 to form a slurry. About 5 to 15% by weight, preferably 5%, of fraction 23 consisting of ground meal or flour is used to form the slurry. The pH range is important because this is the range at which the major part of the protein is insoluble.

The slurry is then passed through a 10mm hydrocyclone separator 1 available from Dorr-Oliver, Inc. Stamford, Connecticut. The hydrocyclone separator divides the slurry into underflow (UF) 24 and overflow (OF) 31 streams. Underflow stream 24 contains the majority of the intact protein bodies that are separated in the hydrocyclone. The protein can be recovered by centrifugation and drying to form a concentrate of about 68 to about 74% protein by weight. Alternatively, underflow stream 24 can be subjected to further separation if desired to form a highly concentrated product. The stream 24 can be passed through hydrocyclone 2 for further concentration. The underflow stream 25 from hydrocyclone 2 can also be subjected to separation in hydrocyclone 3 to form underflow 27 which can be centrifuged and dried to produce a protein concentrate.

The overflow streams 26, 28, 30 and underflow stream 29 from separations in hydrocyclones 2 and 3 can be recycled or subjected to centrifugation and drying to recover the purified protein.

After separation and recovery of the intact protein bodies in forming a protein concentrate, they may be further washed with alcohol or aqueous systems in a conventional manner to remove sugars and non-protein materials. However, this step is optional and is not intended to limit the process of this invention. Adequate purification and removal of non-protein materials takes place in hydrocyclone separation to produce a protein concentrate with a bland taste and odor and improved texture. The protein content of the concentrate formed by the process of the instant invention may range from about 68 to 82% by weight.

Overflow stream 31 from the first separation can be recycled or subjected to further protein separation and recovery as explained in reference to underflow stream 24. However, the overflow stream 31 contains less protein and more cellular debris resulting in the concentration of smaller amounts of protein bodies than in the underflow stream 24. The increased solids content and whey material may render the overflow stream suitable as a constituent in animal food.

The foregoing steps produce protein concentrates having about 70 to about 82% protein and the absence of the typical beany flavor of the products prepared by the process of this invention ideally suits them for use as supplements to food products.

A more complete understanding of the invention can be obtained by referring to the following illustrative examples which are not intended, however, to be unduly limitative of the invention.

EXAMPLE I

Defatted soyflakes weighing 150 pounds having a protein content of 55% by weight were ground in a Contraplex wide chamber mill A250CW available from Alpine American Corporation, Natick, Massachusetts for a period of approximately 30 minutes, at a rate through the machine of approximately 303 pounds per hour. The material was ground as finely as possible and then air classified according to size with an Alpine Mikroplex Spiral Classifier 132P manufactured by Alpine American Corporation, Natick, Massachusetts to obtain various quantities of air classified fractions from the finely ground flakes. The air classifier was set to produce the majority of the ground defatted flakes in a size less than 10 microns. Approximately 500 grams of the ground fraction of defatted soy flakes having a particle size range of less than 10 microns and a protein content of 57% by weight were dispersed in 10 liters of an aqueous suspending buffer medium which comprised 0.1 molar acetate solution. The buffer medium had a pH of 4.5. The slurry was pumped into a hydrocyclone separator at a varied pressure of about 20 to 40 pounds per square inch. The hydrocyclone separator was a 10 milimeter Doxie type A available from Dorr-Oliver, Inc., Stamford, Connecticut. The slurry was centrifuged at 1000 Xg for 10 minutes and the intact protein bodies were recovered. The buffer medium was again added to both streams and decanted to remove whey constituents and other non-proteinaceous materials. As can be seen in the following Table the protein contents are quite high.

Table II

| | | Protein Content (dwb) Washed Samples | |
|---|---|---|---|
| Trial | Liquid Cyclone Condition | overflow | underflow |
| 1 | 40 psi pressure | 62.7 | 70.0 |
| 2 | 20 psi pressure | 62.9 | 66.9 |
| 3 | 20 psi pressure underflow ¾ closed | 66.0 | 76.5 |
| 4 | 20 psi pressure underflow ½ closed | 64.7 | 71.1 |
| 5 | 20 psi pressure equal underflow overflow split | 69.1 | 74.2 |

EXAMPLE II

The procedure of Example I was followed but the whey components of the defatted flakes were not extracted. The finely ground defatted flakes has a protein content of 57% by weight and were dispersed in an aqueous buffer medium containing 0.1 molar acetate solution. A slurry was formed and pumped into a hydrocyclone separator according to the procedure in Example 1. The following Table 3 shows the results thereof.

Table III

| | | Protein Content (dwb) Unwashed Samples | |
|---|---|---|---|
| Trial | Liquid Cyclone Condition | overflow | underflow |
| 1 | 40 psi pressure | 51.5 | 59.3 |
| 2 | 20 psi pressure | 53.6 | 60.7 |
| 3 | 20 psi pressure underflow ¾ closed | 53.3 | 63.1 |
| 4 | 20 psi pressure underflow ½ closed | 49.3 | 52.4 |
| 5 | 20 psi pressure equal underflow overflow split | 53.8 | 58.8 |

As can be seen, removing the whey constituents and other non-proteinaceous material, from the finely ground soy flakes after the liquid cyclone fractionation increased the protein content of both overflow and underflow fractions, but had essentially no effect upon the amount of protein fractionation between the overflow and underflow streams. This latter conclusion is based upon the average difference in protein content of particles from overflow and underflow streams, that is, about 6.6% unwashed and about 6.7% washed.

EXAMPLE 3

The procedure of Example 1 was followed but a series of hydrocyclone separators were utilized for both the overflow (OF) and underflow (UF) streams to produce a protein concentrate from the underflow stream. After the initial separation of the hydrocyclone separator the underflow stream was then again subjected to hydrocyclone separation and that underflow stream was subsequently separated again by the hydrocyclone separator. The following table is illustrative of the protein and solids content of the product. The initial protein content of the soy flour was about 57% by weight, and about 60% of its particles had a diameter of 10 microns or less. The initial solids content was 5% by weight. Additionally, this procedure was followed for the overflow stream.

Table IV

| | (Per Cent by Weight) | | |
|---|---|---|---|
| | 1st Separation OF/UF | 2nd Separation OF/UF | 3rd Separation OF/UF |
| Protein Concentration | 70.8/74.6 | 72.7/76.5 | 73.4/79.7 |
| Solids Content | 3.5/7.25 | 4.9/9.6 | 6.5/11.4 |

EXAMPLE 4

The procedure of Example 1 was followed however, the defatted soyflakes were finely ground to a size of 40 microns or greater and not air classified. The initial protein content was 63% by weight and the solids content was 5.0% by weight. Two separations were performed and the following Table shows the results.

Table V

| | (Per Cent by Weight) | |
|---|---|---|
| | 1st Separation OF/UF | 2nd Separation OF/UF |
| Protein Concentration | 60/66.7 | 57.2/68.4 |
| Solids Content | 3.7/6.5 | 3.0/8.0 |

Higher protein concentrations are obtained when about 60% of the defatted soyflakes are ground to a diameter of 10 microns or less.

EXAMPLE 5

To illustrate the improved texture of the protein concentrate made by the process of the instant invention, 100 grams of the concentrate were made according to Example 1. The concentrated soy protein had a protein content on a dry weight basis of 75% and a pH of 4.5. The concentrate was mixed with 175 ml of water and 2.5 grams of sodium bicarbonate to raise the pH to 6.0. It was mixed in a food mixer for 5 minutes and rolled by hand into a small cylindrical loaf four inches long and one inch in diameter. It was generally treated according to the procedure shown in U.S. Pat. No. 3,662,673. The loaf was placed in a microwave oven at 1.0KW microwave power, 220V, 2450 megacycles for 45 seconds. The resulting product was removed and cooled. The concentrate product would not tear easily; it was sliced with a knife and the internal structure was observed to be cellular. One slice of the concentrate product was measured for resistance to shearing force with an Instron Universal Testing machine. The average measurement was about 500 pounds shearing force per gram of solids.

A commercially available soy protein concentrate having 70% protein on a dry weight basis and a pH of 6.5 was tested in a similar manner. However, no sodium bicarbonate was added to raise the pH. The resulting product was observed to have a non-structured, crumbly texture. The average measurement using the Instron Universal Test Instrument was 97 pounds shearing force per gram of solids.

EXAMPLE 6

The product of the process of the instant invention containing 82% by weight protein on a dry basis and a commercially available soy concentrate containing 70% protein by weight on a dry basis were dissolved to 1% solids content and organoleptically tested by a trained panel. Each sample was adjusted to pH 7.0 with NaOH. The seven panelists were asked to rate each sample for beany, bitter and astringent flavor attributes. Odor and an overall rating were also given to each sample by each panelist. Each sample attribute was rated on a hedonic scale of 1–9 with #1 being extremely strong and #9 being undetectable. Each panelist was asked to rate each sample without knowing its identity. The results are in the following table.

Table VI

| Product | Beany | Bitter | Astringent | Odor | Overall |
|---|---|---|---|---|---|
| Commercial Product | 2.5 | 3.3 | 4.3 | 3.0 | 2.8 |
| Product of Invention | 4.9 | 6.9 | 6.3 | 5.7 | 5.7 |

Each of the panelists rated the product of the instant invention improved in the various flavor attributes. In general, the rankings go from strong (<3 rating) to mild (<5 rating). No panelist rated the product of the instant invention worse than the commercial product.

As can be seen from the examples, the instant invention not only provides a method of making a soy protein concentrate having a protein level of about 68 to 82% by weight, but also provides a product with improved texture and flavor characteristics.

The above examples are merely illustrative of the instant invention and it will be understood that various other changes in the details, materials or steps which had been described may be made without departing from the spirit of the instant disclosure, and such changes and other modifications are intended to be included within the scope of the instant disclosure and appended claims.

What is claimed is:

1. A process for recovering protein from a vegetable protein containing material comprising:
   a. grinding a vegetable protein containing material to a particle size range of less than about 40 microns,
   b. admixing said ground material in an aqueous solution having a pH of about 4-6,
   c. separating said ground material into protein bodies and cellular debris in said solution,
   d. separating said solution into overflow and underflow streams, said overflow streams substantially containing cellular debris, said underflow stream substantially containing protein bodies and
   e. recovering a concentrated protein material from said streams.

2. A process as set forth in claim 1 wherein said vegetable protein containing material is an oilseed material.

3. A process as set forth in claim 2 wherein said oilseed material is soybean flakes.

4. A process as set forth in claim 3 wherein said soybeans are defatted.

5. A process as set forth in claim 1 wherein about 1 to about 20% by weight of said ground vegetable containing material is mixed with said aqueous solution.

6. A process as set forth in claim 5 wherein the ground vegetable containing material is present at about 5% by weight.

7. A process as set forth in claim 1 wherein said aqueous solution is selected from the group consisting of aqueous weak acids and aqueous alcohol solutions.

8. A process as set forth in claim 1 wherein the pH of said aqueous solution is about 4.5.

9. A process as set forth in claim 7 wherein said aqueous solution is 0.1 molar acetate.

10. A process as set forth in claim 1 wherein separation of said solution into said underflow and overflow streams is accomplished by hydrocyclone separator.

11. A process for recovering protein from a vegetable protein containing material comprising;
   a. grinding about 60% of said vegetable protein containing material to a particle size range of less than 10 microns,
   b. admixing said ground material in an aqueous solution having a pH of about 4 to 6,
   c. separating said ground material into protein bodies and cellular debris and said solution,
   d. separating said solution into overflow and underflow streams, said overflow stream substantially containing cellular debris, said underflow stream substantially containing protein bodies and
   e. recovering a concentrated protein material from said streams.

12. A process as set forth in claim 11 wherein said vegetable protein containing material is an oilseed material.

13. A process as set forth in claim 12 wherein said oilseed material is soybean flakes.

14. A process as set forth in claim 13 wherein said soybeans are defatted.

15. A process as set forth in claim 11 wherein about 1 to about 20% by weight of said ground vegetable containing material is mixed with said aqueous solution.

16. A process as set forth in claim 15 wherein the ground vegetable containing material is present at about 5% by weight.

17. A process as set forth in claim 11 wherein said aqueous solution is selected from the group consisting of aqueous weak acids and aqueous alcohol solutions.

18. A process as set forth in claim 11 wherein the pH of said aqueous solution is about 4.5.

19. A process as set forth in claim 17 wherein said aqueous solution is 0.1 molar acetate.

20. The process as set forth in claim 11 wherein said vegetable protein containing material is mixed in an aqueous solution to wash non-proteinaceous material and whey constituents after step e.

21. A process as set forth in claim 20 wherein said aqueous solution is selected from the group consisting of alcohol, aqueous weak acids and aqueous alcohols.

22. A process for producing a protein concentrate from a vegetable protein containing material comprising:
   a. grinding about 60% of vegetable protein containing material to a particle size range of less than about 10 microns,
   b. admixing said ground material in an aqueous solution having a pH of about 4.5,
   c. separating said ground material into protein bodies and cellular debris in said solution,
   d. separating said solution to an overflow and underflow stream, said overflow stream substantially containing cellular debris, said underflow stream substantially containing protein bodies,
   e. recovering a concentrated protein material from said overflow and underflow streams, and
   f. removing non-proteinaceous materials and whey constituents from said concentrated protein material.

23. A process as set forth in claim 22 wherein said vegetable containing material is defatted soybean flakes.

24. A process as set forth in claim 22 wherein said aqueous solutions are selected from the group consisting of aqueous weak acids, aqueous alcohol solutions.

25. A process as set forth in claim 22 wherein said aqueous solution is 0.1 molar acetate.

26. A process as set forth in claim 22 wherein about 1% to 20% by weight of ground vegetable containing material is admixed with 0.1 molar acetate solution.

27. A process as set forth in claim 22 wherein separation of the solution to said streams is accomplished by hydrocyclone separator.

28. A process as set forth in claim 22(f) wherein said non-proteinaceous material and whey constituents are removed by washing of said concentrated protein material with a solution selected from the group consisting of alcohol, aqueous weak acids and aqueous alcohol solutions.

29. A process of claim 22 wherein said protein concentrate has a protein content of about 68-82% by weight.

30. The product of claim 22.

* * * * *

UNITED STATES PATENT AND TRADEMARK OFFICE
CERTIFICATE OF CORRECTION

PATENT NO. : 4,146,534
DATED : March 27, 1979
INVENTOR(S) : David J. Armstrong

It is certified that error appears in the above-identified patent and that said Letters Patent are hereby corrected as shown below:

Column 5, lines 42 to 48, the table should read:

Table I

Typical particle size distribution of 150 pounds of ground defatted soy flakes.

| Particle Size Range | Quantity |
|---|---|
| Less than 10 microns | 82 lbs. |
| 10 to 20 microns | 32 lbs. |
| 20 to 45 microns | 29 lbs. |
| Over 45 microns | 7 lbs. |

Signed and Sealed this

Seventeenth Day of July 1979

[SEAL]

Attest:

Attesting Officer

LUTRELLE F. PARKER
Acting Commissioner of Patents and Trademarks